United States Patent
Harrington

(10) Patent No.: US 6,411,336 B1
(45) Date of Patent: Jun. 25, 2002

(54) SYSTEMS AND METHODS FOR INTRA- AND INTER-FIELD ALIGNING OF VIDEO FRAMES

(75) Inventor: Steven J. Harrington, Webster, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/163,164

(22) Filed: Sep. 30, 1998

(51) Int. Cl.[7] ............................. H04N 5/44; H04N 7/00
(52) U.S. Cl. ....................................... 348/559; 348/497
(58) Field of Search ................................. 348/559, 511, 348/572, 497, 630, 625; 358/447; H04N 5/44, 7/00, 5/21

(56) References Cited

U.S. PATENT DOCUMENTS 6,031,581 A * 2/2000 Harrington ................... 348/630
6,101,285 A * 8/2000 Fan ............................. 358/455

* cited by examiner

Primary Examiner—Sherrie Hsia
(74) Attorney, Agent, or Firm—Oliff & Berridge, PLC

(57) ABSTRACT

A method and apparatus to improve the vertical alignment of images captured from video. The method shifts a current scanline by an alignment offset detected locally between either the two fields of the image or within a field of the image itself. This aligns the current scanline to more closely correspond with adjacent intra-field or inter-field scanlines, thereby reducing wiggles or jitters in the vertical lines of the image.

21 Claims, 6 Drawing Sheets

SYSTEMS AND METHODS FOR INTRA- AND INTER-FIELD ALIGNING OF VIDEO FRAMES

BACKGROUND OF THE INVENTION

1. Field of Invention

This invention is related to capturing and printing still images from video data signals. In particular, this invention is directed to a system and method to improve the vertical alignment of images captured from video.

2. Description of Related Art

Video recorders, camcorders and VCRs, for example, provide a source of electronic video images. However, especially in consumer-quality video recorders, when still images are captured from the video data signal and printed, the quality of the captured and printed still images is often less than desired. Furthermore, these video recorders may inaccurately synchronize the video scanlines. This inaccurate synchronization causes the starting point of scanlines to drift horizontally from scanline to scanline, resulting in the common appearance of wiggles or jitters in the vertical lines of the image.

SUMMARY OF THE INVENTION

The NTSC television standard forms a full frame image from two separate fields captured 1/60th of a second apart. One field contributes the even scanlines of the image, while the other field provides the odd scanlines of the image. FIG. 1 shows the odd scanlines 10 and even scanlines 20 which form the full image frame. Furthermore, FIG. 1 illustrates a typical example of the horizontal drift that occurs from scanline to scanline within an even or odd field (intra-field drift) as well as the horizontal drift that occurs between the fields (inter-field drift).

The average scanline starting position between two scan lines of a field will generally be more correct then the starting position of any single scanline. Since the two fields are separated by time, the horizontal drift of the fields will be uncorrelated. Hence, the average scanline starting position between the two fields is likely to be more nearly correct than the average starting position of either field alone. By measuring the misalignment within and between the fields, detecting the wiggle or jitter is straightforward.

U.S. patent application Ser. No. 08/882,933, filed Jun. 26, 1997, U.S. Pat. No. 6,031,581 incorporated herein by reference in its entirety, discloses a system for removing color bleed in a television image adapted for digital printing. Specifically, the 933 application discloses a method for improving an image derived from a television or video tape signal source so that the image can be favorably printed. However, this requires the entire image frame to be stored in memory and several passes over the image to determine the correct alignment.

This invention provides systems and methods for removing horizontal drift in still images captured from video data signals.

This invention separately provides systems and methods for removing intra-field and inter-field drift from captured still images.

This invention separately provides systems and methods that determines an average start position of the scanlines within a field of a captured still image and/or between the two separate fields forming a captured still image.

These and other features and advantages of this invention are described in or are apparent from the following detailed description of the preferred embodiments.

BRIEF DESCRIPTION OF THE DRAWINGS

The preferred embodiments of this invention will be described in detail, with reference to the following figures, wherein.

DETAILED DESCRIPTION OF PREFERRED EMBODIMENTS

Figure 1:
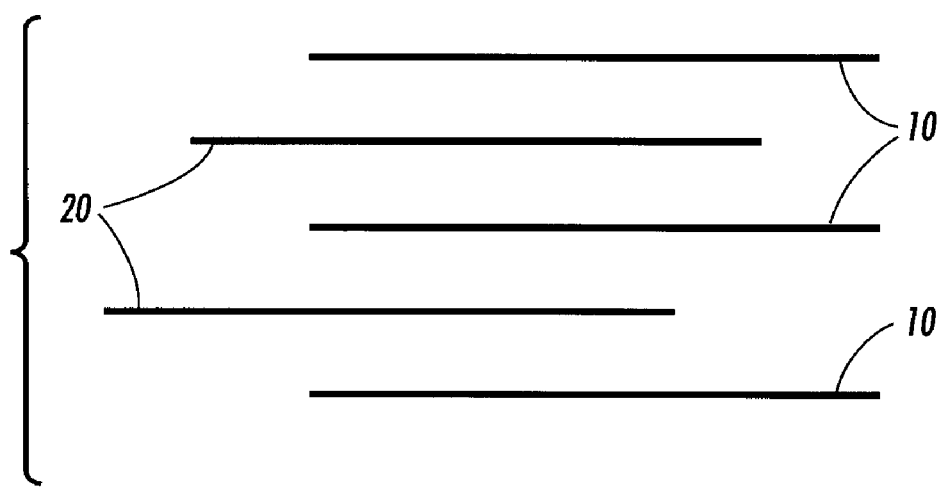
FIG. 1 shows the vertical scanlines in a captured video frame.

To detect the wiggle or jitter in a video frame, the systems and methods of this invention maintain intra- and inter-field horizontal offset values as the scanlines of a video frame are sequentially analyzed. Initially, the intra- and inter-field horizontal offset values are set to zero. As the systems and methods of this invention initially sequentially step through the scanlines either for intra-field aligning or for inter-field aligning, and for each scanline, the sum of the absolute pixel differences between the current scanline and a preceding original unshifted scanline or a preceding shifted scanline is determined. Furthermore, for each scanline, the sum of the absolute pixel differences between the current scanline and a next original unshifted scanline or a next shifted scanline is determined. This provides a comparison between the scanlines within a field and between the even and odd fields. The determined differences for each pair of scanlines are taken between pixels offset by the intra-field offset value and/or the inter-field offset value.

However, it is to be appreciated that it may be desirable to perform both an intra-field and an inter-field alignment to the input still image in order to achieve greater alignment accuracy. Therefore, where the intra-field alignment has already been performed, a subsequent inter-field alignment is based on the shifted, i.e., aligned, scanlines produced by the intra-field alignment. Furthermore, where the inter-field alignment has already been performed prior to the intra-field alignment, a subsequent intra-field alignment is performed on the shifted, i.e., aligned, scanlines produced by the inter-field alignment.

Furthermore, it should be appreciated that the intra-field alignment can be performed on a previously intra-field shifted scanline. Depending on the type of intra- or inter-field mis-alignment, selecting either the previously shifted or unshifted, original scanlines may provide better alignment.

While this invention will be described with reference to an embodiment where the intra-field alignment of the odd and even scanlines will be performed, followed by a subsequent inter-field alignment, it would be obvious to one having ordinary skill in the art to modify the invention to perform either the intra-field or the inter-field alignment separately, or the inter-field alignment prior to, in unison with, or subsequent to the intra-field alignment.

Therefore, in the current exemplary embodiment, where the intra-field alignment is performed prior to the inter-field alignment, if the offset value indicates that the current scanline is likely to be shifted three pixels to the right relative to the previous scanline and next original, unshifted scanline, then a first absolute difference between the value of a selected pixel of the current scanline and the value of a corresponding pixel in the previous scanline that is three pixels to the left of the selected pixel is determined. At the same time, a second absolute difference between the value of the selected pixel and the value of a corresponding pixel in the next original, unshifted scanline that is three pixels to the right of the selected pixel is determined. The first and second absolute differences are then summed. This is repeated until every pixel of the current scanline has been selected.

Similar sums can also be determined for candidate offset values that neighbor the current offset value. For the example shown in FIG. 1, if the inter-field offset value is three, the system and method of this invention also determines the sums for an inter-field offset value of two and an inter-field offset value of four. Furthermore, depending on the time and required precision of the result, offset values plus or minus two from the current offset value, e.g., inter-field offset values of one and five pixels, or even greater shifts could be used as well. This potentially further increases the chances of finding the best alignment.

The offset value which gives the minimum sum is then determined. The offset with the minimum sum gives the best alignment within a field or between the fields for the current scanline is used to adjust the horizontal position of the current scanline. The current scanline is then shifted by half of the determined offset value so that the current scanline moves halfway to meet the next scanline. Generally speaking, the systems and methods of this invention cannot distinguish which of the two scanlines has a position closest to the desired alignment, so the systems and methods of this invention use the average position.

Figure 2:
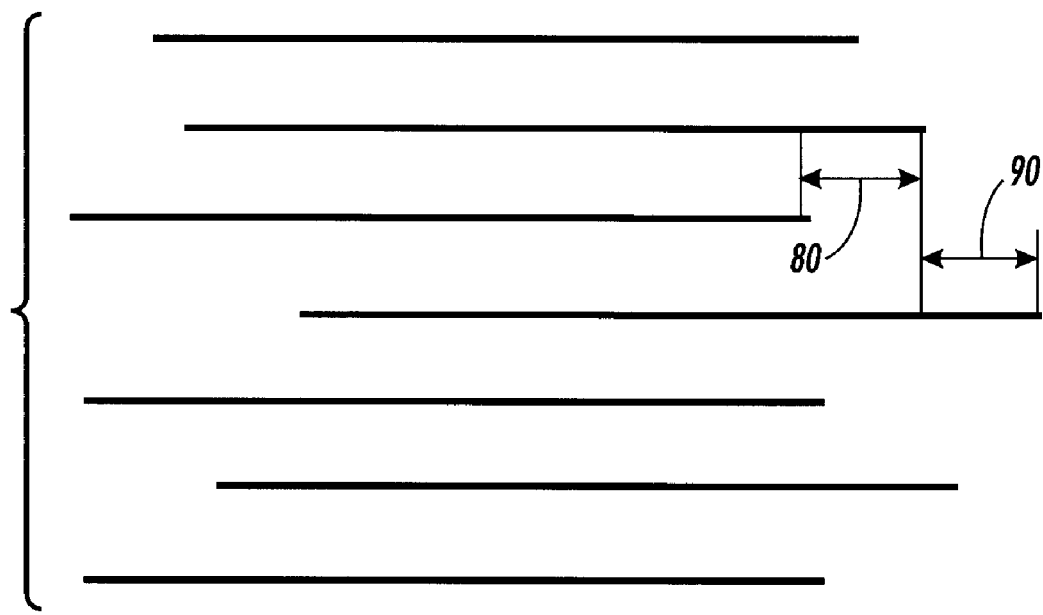
FIG. 2 shows the intra- and inter-field alignments of sets of the vertical scanlines of the captured video frame of FIG. 1.

As shown in FIG. 2, a scanline that extends beyond its neighbors within a field, as illustrated by the distance 90, has an intra-field drift or mis-alignment. This intra-field mis-alignment is distinct from the inter-field offset 80 between the scanlines of different fields. To correct for intra-field mis-alignment, the current scanline is shifted by the full intra-field offset value within the field. In contrast, the current scanline is shifted by only one-half of the inter-field offset value between the fields. In general, in the first instance, the inter-field alignment determination is identical to the intra-field alignment determination, except each scanline is compared to the original unshifted or shifted scanline above it and the original unshifted, or shifted scanline below it, within the same field.

Figure 3:
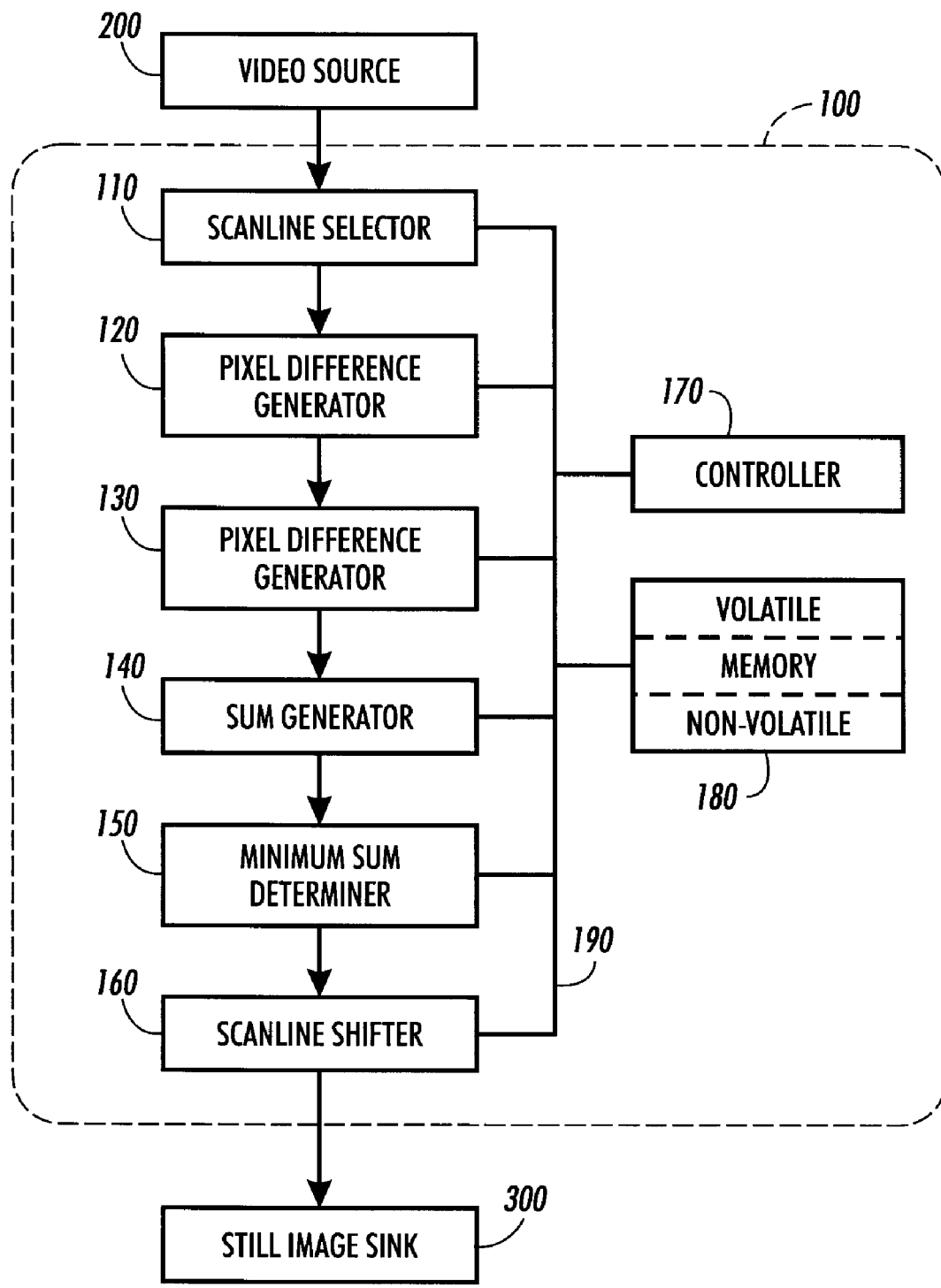
FIG. 3 is one embodiment of a functional block diagram of a system for intra-field and/or inter-field aligning a video frame according to this invention.

FIG. 3 shows a functional block diagram of one embodiment of an alignment system 100 according to this invention. The alignment system 100 includes a scanline selector 110, a pixel difference generator 120, a pixel difference generator 130, a sum generator 140, a minimum sum determiner 150, a scanline shifter 160, a controller 170 and a memory 180, each connected to a data and control bus 190. The alignment system 100 inputs video data signals from a video source 200 and outputs captured still images with aligned fields to a still image sink 300.

The video source 200 that provides the video data signals to the alignment system 100 can be a video camera or any other video source that is capable of providing a video signal or a digitized or captured video frame to the alignment system 100.

The image sink 300 may be any one of a number of different image sinks, such as a printer, a digital copier or a facsimile machine device, that are suitable for receiving electronic image data, or a device suitable for storing and/or transmitting electronic image data, such as a client or server of a network, or a non-volatile memory such as a hard drive and disk or floppy drive and disk.

The controller 170 controls the operation of each of the scanline selector 110, the pixel difference generators 120 and 130, the sum generator 140, the minimum sum determiner 150 and the scanline shifter 160 based on one or more control routines stored in the memory 180.

The memory 180 should have at least a non-volatile portion 182 that is able to persistently store the control routine, such as ROM, flash memory or a magnetic media storage drive, such as a floppy drive and disk or a hard drive and disk, although it may also have a volatile portion 184, such as RAM or the like. Furthermore, the memory 180 should be capable of storing information relating to both shifted and unshifted versions of the input data signal. As previously discussed, the methods and systems of this invention could use both shifted and unshifted versions of the input video data to achieve even greater accuracy.

The pixel difference generator 120 determines the absolute difference between the current scanline and a previous scanline that is above the current scanline in either the same field or a different field. Furthermore, the pixel difference generator 130 determines the absolute difference between the current scanline and a next scanline that is below the current scanline in either the same field or a different field. However, it is to be appreciated that the next and previous scanlines can be shifted or original, unshifted scanlines.

The sum generator 140 determines the candidate offsets that neighbor the determined current offset. The minimum sum determiner 150 determines which of the determined offset values provides the minimum sum. This offset value will provide the best alignment of the current, previous and next scanlines and will be used to adjust the horizontal position of the current scanline. The scanline shifter 160 uses this offset value to shift the current scanline to improve the intra- or inter-field alignment.

In operation, the scanline selector 110 receives a video data signal representing a video frame having even and odd fields from the video source 200. The even and odd scanline fields of the video data signal can then be merged, and the merged input video data signal can be stored in the memory 180. In this case, as each scanline is analyzed, that scanline, the previous scanline and the next scanline are read from the memory 180 and output to the pixel difference generators 120 and 130. Alternately, each scanline of a previously merged interlaced input video data signal can be directly input to the pixel difference generators 120 and 130.

Furthermore, the methods and systems of this invention allow for interlaced input video data signals to be input to the pixel difference generators. As discussed below, while, in general, the intra-field alignment is corrected prior to correcting the inter-field alignment, the methods and systems of this invention work equally well when correcting the intra-field and inter-field alignment in unison, or when correcting the inter-field alignment prior to the intra-field alignment. To implement these various techniques, only the number of scanlines stored in memory needs to be adjusted.

Figure 7:
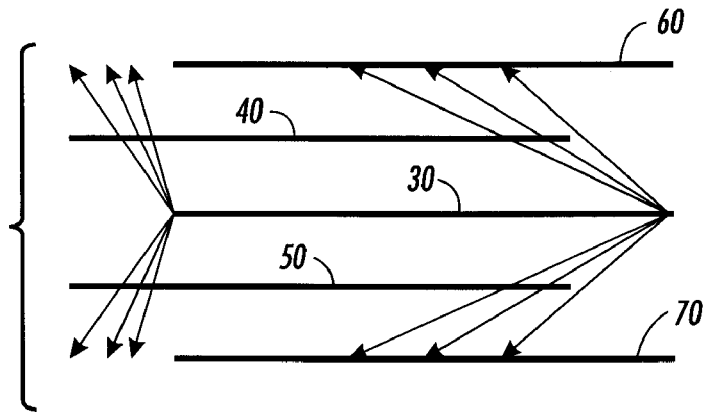
FIG. 7 shows the horizontal offsets between vertically adjacent scanlines in different fields of the video frame of FIG. 1.

For intra-field alignment correction, the scanline selector 110, under the control of the controller 170, sequentially selects each previously shifted scanline within a selected field of the input video image. As each scanline from the selected field of the video data signal is selected, that scanline, a previously shifted scanline and a next original, unshifted scanline of the selected field are provided to the pixel difference generators 120 and 130. The pixel generators 120 and 130 generate the sum of the absolute pixel difference between the current scanline and the previous original, unshifted scanline, and the current scanline and the next original, unshifted scanline respectively, based on a current value for the intra-field offset. The offset value that results in the smallest pixel difference between a current scanline and the previous and/or next scanlines, or both scanlines, is the intra-field mis-alignment. The sum generator 140 sums the pixel difference between the current scanline and the previous original, unshifted scanline, and the pixel difference between the current scanline and the next original, unshifted scanline, as shown in FIG. 7, between the scanlines 30, 60 and 70 based on the current value of the intra-field offset. Sums are generated for at least these different horizontal offsets, namely the current offset value, and its incremented and decremented values.

As the alignment system 100 in turn selects each of the scanlines of the selected field, the intra-field horizontal offset value is updated in the system memory 180 under the direction of controller 170. As previously mentioned, the intra-field horizontal offset value is initially set to zero.

The minimum sum detector 150 determines which offset value gives the minimum sum. This offset value will provide the best alignment between scanlines for this particular scanline and is used by the scanline shifter 160 to adjust the horizontal position of the current scanline. The scanline shifter 160 shifts the current scanline by the full offset value so that the current scanline is adjusted for better alignment within a field and stores the shifted scanline in the memory 180 as part of an intra-field adjusted video image. Alternatively, the scanline shifter 160 could directly output the shifted scanline to a broadcast or transmission network, or a video printer or the like.

Then, for the inter-field alignment correction, the scanline selector 110, under the control of the controller 170, sequentially selects each shifted scanline of the stored intra-field adjusted video image. As each shifted scanline of the intra-field adjusted video image is selected, that scanline, the previous shifted scanline and the next shifted scanline of the other field are provided to the pixel difference generators 120 and 130. The pixel generators 120 and 130 generate the sum of the absolute pixel difference between the current scanline and the previous shifted scanline, and the current scanline and the next shifted scanline respectively, based on a current value for the inter-field offset. The offset value that results in the smallest pixel difference between a current scanline and the previous shifted scanline and the next shifted scanline, or both, is the inter-field mis-alignment. The sum generator 140 sums the pixel difference between the current scanline and the previous shifted scanline, and the pixel difference between the current scanline and the next shifted scanline, as shown in FIG. 7, between the scanlines 30, 40 and 50 based on the current value of the inter-field offset. Sums are generated for at least these different horizontal offsets, namely the current offset value, and its incremented and decremented values.

As the alignment system 100 in turn selects each of the scanlines, the inter-field horizontal offset value is updated in the system memory 180 under the direction of controller 170. As previously mentioned, the inter-field horizontal offset value is initially set to zero.

The minimum sum detector 150 determines which offset value gives the minimum sum. This offset value will provide the best alignment between fields for this particular scanline and is used by the scanline shifter 160 to adjust the horizontal position of the current scanline. The scanline shifter 160 shifts the current scanline by half of the offset value so that the current scanline moves halfway for better alignment between adjacent scanlines and stores that shifted scanline in the memory 180 as part of an inter-field adjusted video image.

Figure 4:
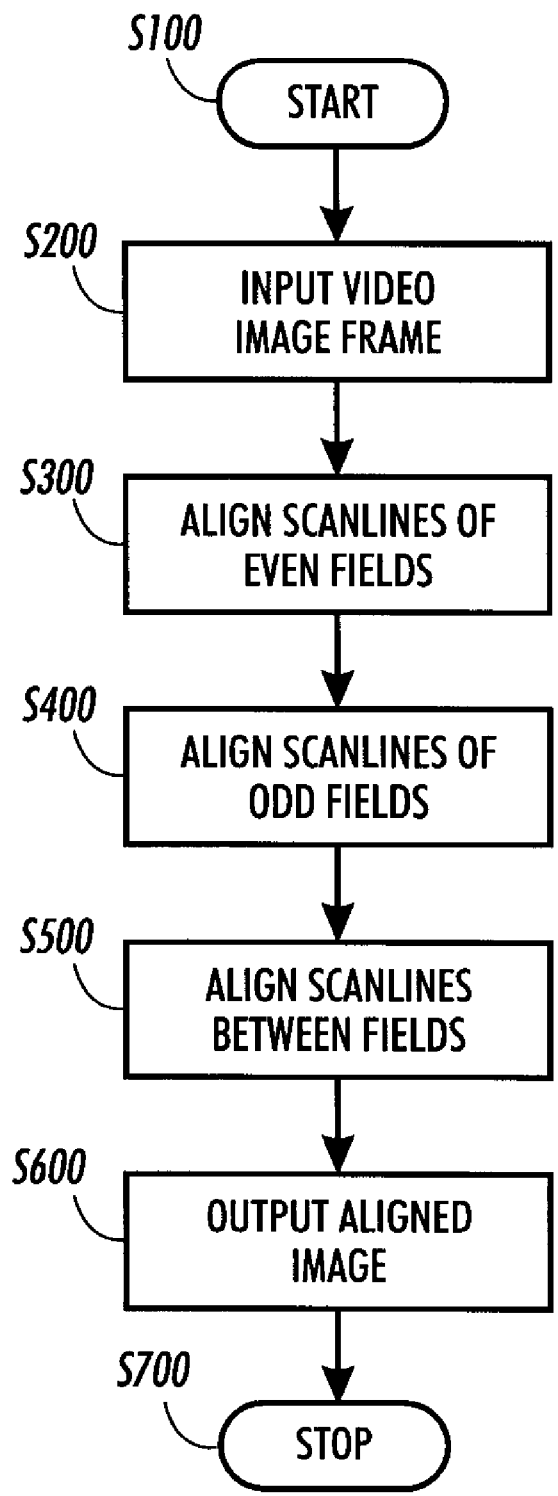
FIG. 4 outlines one embodiment of a method of improving vertical alignment of scanlines in a captured still image according to this invention.

FIG. 4 is a flowchart outlining one embodiment of a method that improves the vertical alignment of images captured from video data signal according to this invention. Specifically, FIG. 4 outlines a method where the intra-field alignment is performed prior to the inter-field alignment. Control begins in step S100. Next, in step S200, an interlaced video image frame, containing both even and odd fields, is input. Control then continues to step S300.

In step S300, the scanlines of the even field are intra-field aligned. Then, in step S400, the scanlines of the odd field are intra-field aligned. Next, in step S500, the shifted scanlines of the even and odd fields are inter-field aligned. Control then continues to step S600.

In step S600, the aligned image is output. Then, in step S700, the control sequence ends.

It should also be appreciated that the intra-field aligning steps S300 and S400 can alternatively be performed independently on the even and odd fields. That is, intra-field aligning steps can be performed before the captured fields forming the captured frame are merged. This could simplify the analysis of these fields. Furthermore, once a number of scanlines of both fields have been individually intra-field aligned, the intra-field aligned scanlines can be immediately inter-field aligned without requiring either field to be completely intra-field aligned.

Figure 5:
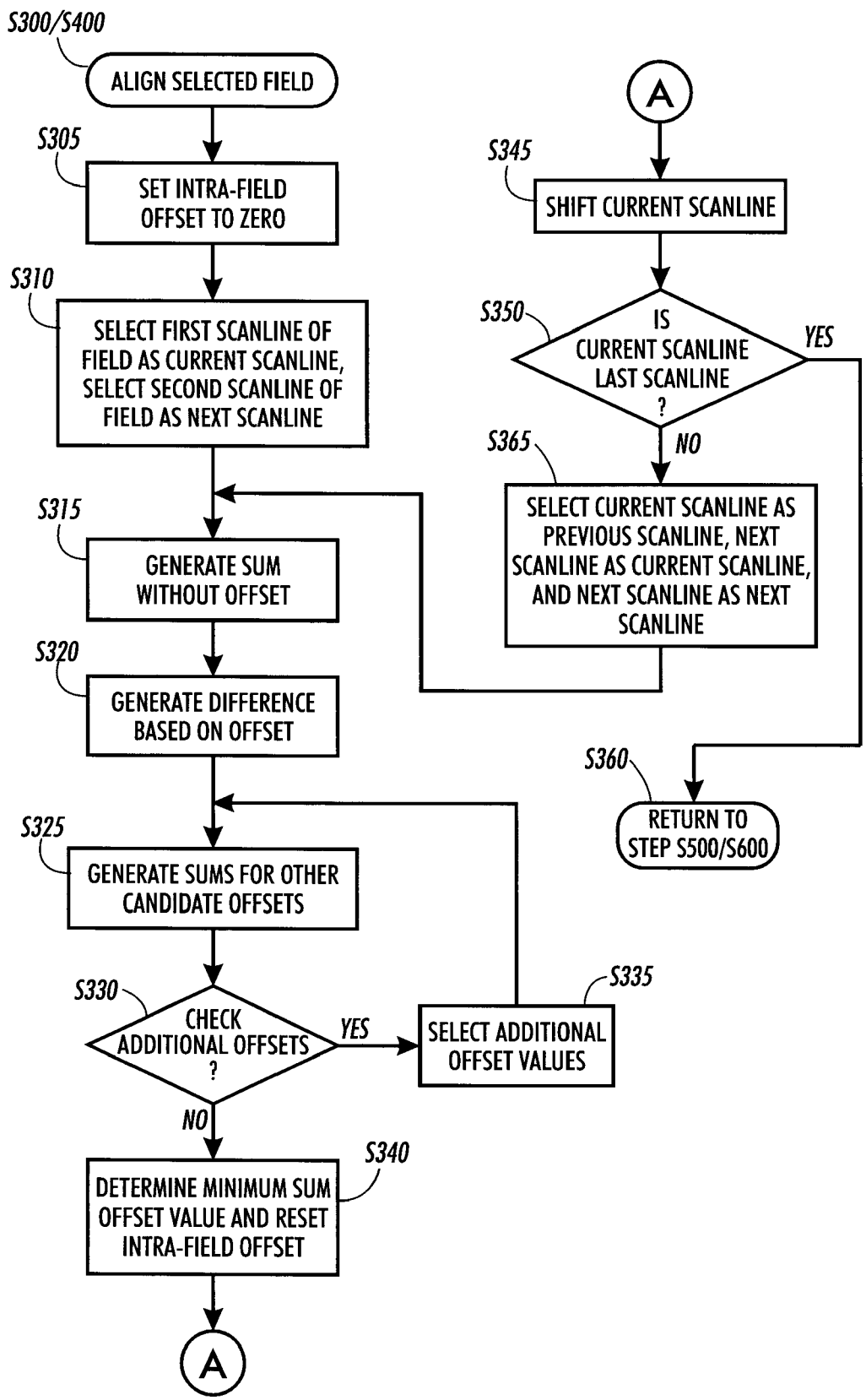
FIG. 5 outlines one embodiment for the step of intra-field aligning the scanlines of a field of FIG. 4 in greater detail.

FIG. 5 is a flowchart outlining one embodiment of the method of aligning the even and odd fields of steps S300 and S400 of FIG. 4 in greater detail. Control begins in step S300 or S400. In either case, control continues to step S305. In step S305, a video image frame is input and an intra-field horizontal offset initially set to zero. Then, in step S310, the first scanline of the current field is selected as the current scanline and the second original, unshifted scanline of the same field is selected as the next scanline. At this time there is no previous scanline. However, in the instance where there is no previous scanline, the current scanline could be used as the previous scanline. Control then continues to step S315.

In step S315, the sums of the absolute pixel difference between the current scanline and the previous shifted, or shifted if desired, scanline (if present) are determined, and the sum between the current scanline and the next original, unshifted scanline (if present) are determined. Next, in step S320, the sums of the differences between pixels offset by the intra-field offset value are determined for the current offset value. Then, in step S325, the sums for candidate offsets, i.e., the current offset value plus or minus one, that border the current offset are determined. Control then continues to step S330.

In step S330, the sums and differences determined in steps S315–S325 are checked to determine if additional offset values, e.g., the current offset plus or minus two, need to be considered. If so, control continues to step S335. Otherwise, control jumps to step, S340.

In step S335, the additional offset values are selected. Control then returns to step S325.

In step S340, the offset value giving the minimal sum of the absolute differences is determined and the intra-field offset value is set to this value. This intra-field offset value gives the best alignment within a field for the current scanline. Then, in step S345, the current scanline is each shifted by offset value and stored as part of an intra-field adjusted video image, so that the current scanline moves to become more closely aligned with the previous and next scanlines. Control then continues to step S350.

In step S350, the current scanline is checked to determine if the current scanline is the last scanline in the current field. If so, control jumps to step S360. Otherwise control continues to step S365. In step S365, the current original, unshifted scanline is selected as the previous scanline, the next original, unshifted scanline is selected as the current scanline, and the next original, unshifted scanline in the current field is selected as the next scanline. Control then jumps back to step S315.

In step S360, the control sequence returns to either step S300 or S400, depending on which field is being aligned.

Figure 6:
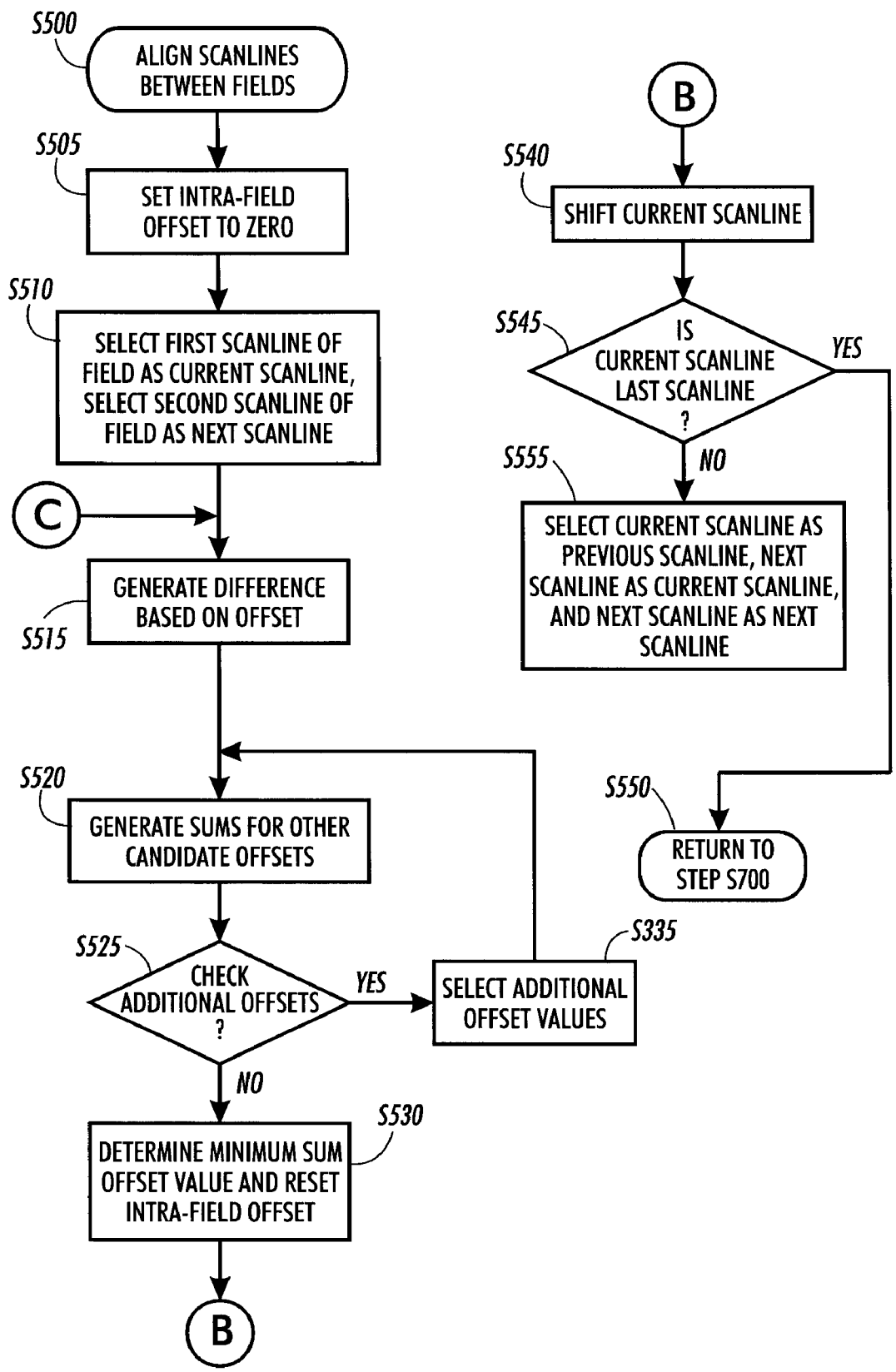
FIG. 6 outlines one embodiment for the step of inter-field aligning the scanlines between the fields of FIG. 4 in greater detail.

FIG. 6 is a flowchart outlining one embodiment of the method of aligning the scanlines between fields of step S500 in greater detail. Control begins in step S500. Next, in step S505, the intra-field aligned fields of the merged image video image frame are input and an inter-field horizontal offset is initially set to zero. Then, in step S510, the first shifted scanline of the merged image is selected as the current scanline and the second shifted scanline of the merged image, i.e., the first scanline of the other field, is selected as the next scanline. At this time there is no previous scanline. Control then continues to step S515.

In step S515, the sums of the differences between pixels offset by the inter-field offset value are determined for the current offset value. Then, in step S520, sums for candidate offsets, i.e., the current offset value plus or minus one, that border the current offset are determined. Control then continues to step S525.

In step S525, the sums and differences determined in steps S515–S520 are checked to determine if additional offset values need to be considered. If so, control continues to step S530. Otherwise, control jumps to step S535.

In step S530, the additional offset values, e.g., the current offset value plus or minus two, are selected. Control then returns to step S520.

In step S535, the offset value giving the minimum sum of the absolute differences is determined and the inter-field offset value is set to this value. This offset value gives the best alignment between the fields for the current scanline.

Then, in step S540, the current scanline is shifted by one-half the offset value, so that it moves halfway to become more closely aligned with each other scanline and the shifted scanline is stored as part of an inter-field adjusted video image. Control then continues to step S545.

In step S545, the current scanline is checked to determine if the current scanline is the last scanline in the merged image. If so, control jumps to step S550. Otherwise control continues to step S555. In step S555, the current shifted scanline is selected as the previous scanline, the next shifted scanline is selected as the current scanline, and the next shifted scanline in the image is selected as the next scanline. Then, in step S560, the sign of the offset is inverted. Control then jumps back to step S515.

In step S545, the control sequence returns to step S500 of FIG. 4.

Figure 8:
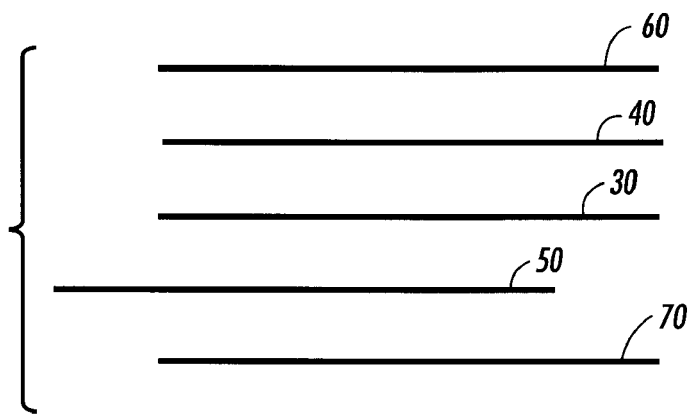
FIG. 8 shows the corrected vertical scanlines of the video frame of FIG. 1.

FIG. 8 shows the corrected alignment between fields. Specifically, the scanline 60 is shifted to the left, the scanline 40 is shifted to the right, the scanline 30 is shifted to the left, the scanline 50 is shifted to the right and the scanline 70 is shifted to the left. Clearly the alignment is far improved over the alignment shown in FIG. 6. It is to be appreciated that in inter-field aligning the even and odd video frames, even better results can be obtained by comparing the alignment of the current scanline with the scanlines above and below the current scanline in the same field. This requires buffering at least five scanlines. If there is wiggle in the alignment, then some scanlines will have the local maximum drift. These scanlines will be identified and shifted left or right, relative to both the scanline above and the scanline below in the same field as the current scanline. These scanlines can be shifted the full amount to align these scanlines with the neighboring scanlines in the same field, as well as half the amount of the offset between the neighboring scanlines in the other field.

It is also to be appreciated that in intra-field aligning the even and odd video frames, even better results can be obtained by comparing the alignment of the current scanline with the scanlines above and below the current scanline in the same field. This requires buffering at least five scanlines. If there is wiggle in the alignment, then some scanlines will have the local maximum drift. These scanlines will be identified and shifted left or right, relative to both the scanline above and the scanline below in the same field as the current scanline. These scanlines can be shifted the full amount to align these scanlines with the neighboring scanlines in the same field, as well as half the amount of the offset between the neighboring scanlines in the other field.

Figure 9:
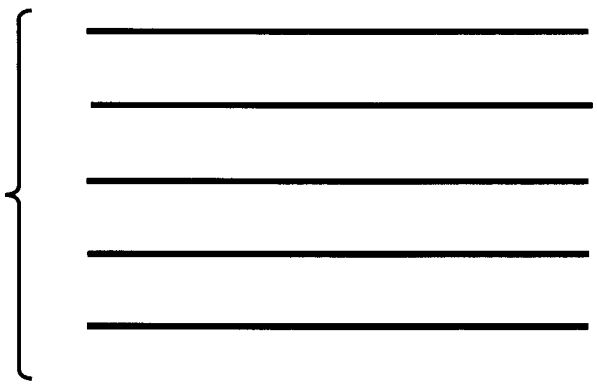
FIG. 9 shows the corrected intra- and inter-field alignments of the captured video frame of FIG. 1 according to this invention.

FIG. 9 shows the corrected alignment between fields. Clearly the alignment is far improved over the alignment shown in FIG. 8.

As shown in FIG. 3, the alignment device is preferably implemented either on a single programmed general purpose computer or separate programmed general purpose computers. However, the intra- and inter-field alignment device can also be implemented on a special purpose computer, a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 4–6 can be used to implement the intra-field and inter-field alignment device.

It is, therefore, apparent that there has been provided in accordance with the present invention a method and apparatus for intra- and inter-field alignment of video images. While this invention has been described in conjunction with preferred embodiments thereof, it is evident that many alternatives, modifications, and variations be apparent to those skilled in the art. Accordingly, applicants intend to embrace all such alternatives, modifications or variations to follow in the spirit and scope of this invention.

What is claimed is:

1. A system for aligning still video images, comprising:
a scanline selector that sequentially selects each of a plurality of scanlines of an input video image;
at least one pixel difference generator that generates at least one of at least one alignment difference between a current scanline and at least one previous scanline, and at least one alignment difference between the current scanline and at least one next scanline for each of at least one offset value;
a sum generator that determines at least one of a total alignment difference between the current scanline and at least one other scanline for each of the at least one offset value;
a minimum sum detector that determines which offset value provides a minimum of the total alignment differences generated by the sum generator for the at least one offset value; and
a scanline shifter that shifts the current scanline by at least a fraction of the offset value.

2. The system of claim 1, wherein the previous scanline, the current scanline and the next scanline are in the same field.

3. The system of claim 1, wherein the previous scanline, and the next scanline are in a different field than the current scanline.

4. The system of claim 1, wherein the scanline shifter shifts the current scanline by one-half of the offset value.

5. The system of claim 1, wherein, based on the determined total alignment differences, the at least one pixel difference generator generates alignment differences for additional offset values.

6. The system of claim I, wherein the scanline shifter shifts the current scanline by a portion of an intra-field offset within a field plus a portion of an inter-field offset between the fields.

7. The system of claim 1, wherein the other scanline is at least one of at least one previous scanline and at least one next scanline.

8. The system of claim 1, wherein the at least one alignment difference is a pixel difference.

9. The system of claim 1, wherein the at least one alignment difference is a sum of pixel differences.

10. The system of claim 1, wherein the at least one alignment difference is a sum of absolute pixel differences.

11. A method for aligning still video images, comprising:
inputting a video image frame;
sequentially selecting each of a plurality of scanlines of an input video image;
generating at least one of at least one alignment difference between a current scanline and at least one previous scanline, and at least one alignment difference between the current scanline and at least one next scanline for each of at least one offset value;
determining at least one total alignment difference between the current scanline and at least one other scanline for each of the at least one offset value;
determining which of the at least one offset value provides a minimum total alignment difference for the at least one offset value; and
shifting the current scanline by at least a fraction of the offset value.

12. The method of claim 11, wherein generating the at least one alignment difference comprises determining the total alignment difference between the current scanline and the at least one previous scanline, and the total alignment difference between the current scanline and the at least one next scanline for previous, next and current scanlines in the same field.

13. The method of claim 11, wherein generating the at least one alignment difference comprises determining the total alignment difference between the current scanline and the at least one previous scanline, and the total alignment difference between the current scanline and the at least one next scanline for previous and next scanlines that are in a different field than the field containing the current scanline.

14. The method of claim 11, wherein shifting the current scanline by a fraction of the offset value comprises shifting the current scanline by one-half of the offset value to provide better alignment.

15. The method of claim 11, further comprising, based on the determining a total alignment difference, generating sums for the alignment differences of additional offset values.

16. The method of claim 11, further comprising shifting the current scanline by an intra-field offset within a field plus a portion of an inter-field offset between the fields.

17. The method of claim 11, further comprising updating, for each scanline, the offset value.

18. The method of claim 11, wherein the at least one other scanline is at least one of the previous scanline, and the at least one next scanline.

19. The method of claim 11, wherein the at least one alignment difference is a pixel difference.

20. The method of claim 11, wherein the at least one alignment difference is a sum of pixel differences.

21. The method of claim 11, wherein the at least one alignment difference is a sum of absolute pixel differences.

* * * * *